UNITED STATES PATENT OFFICE.

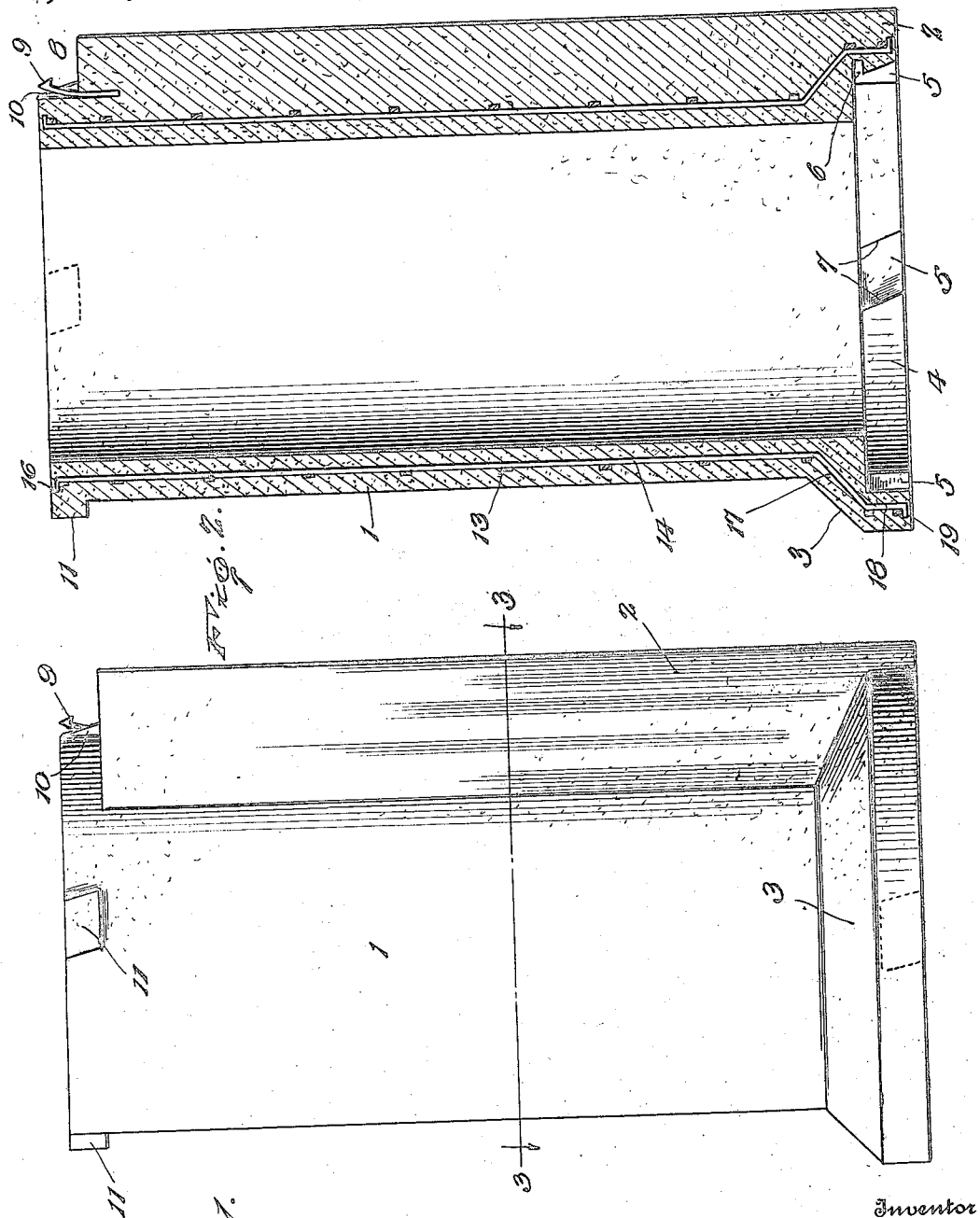

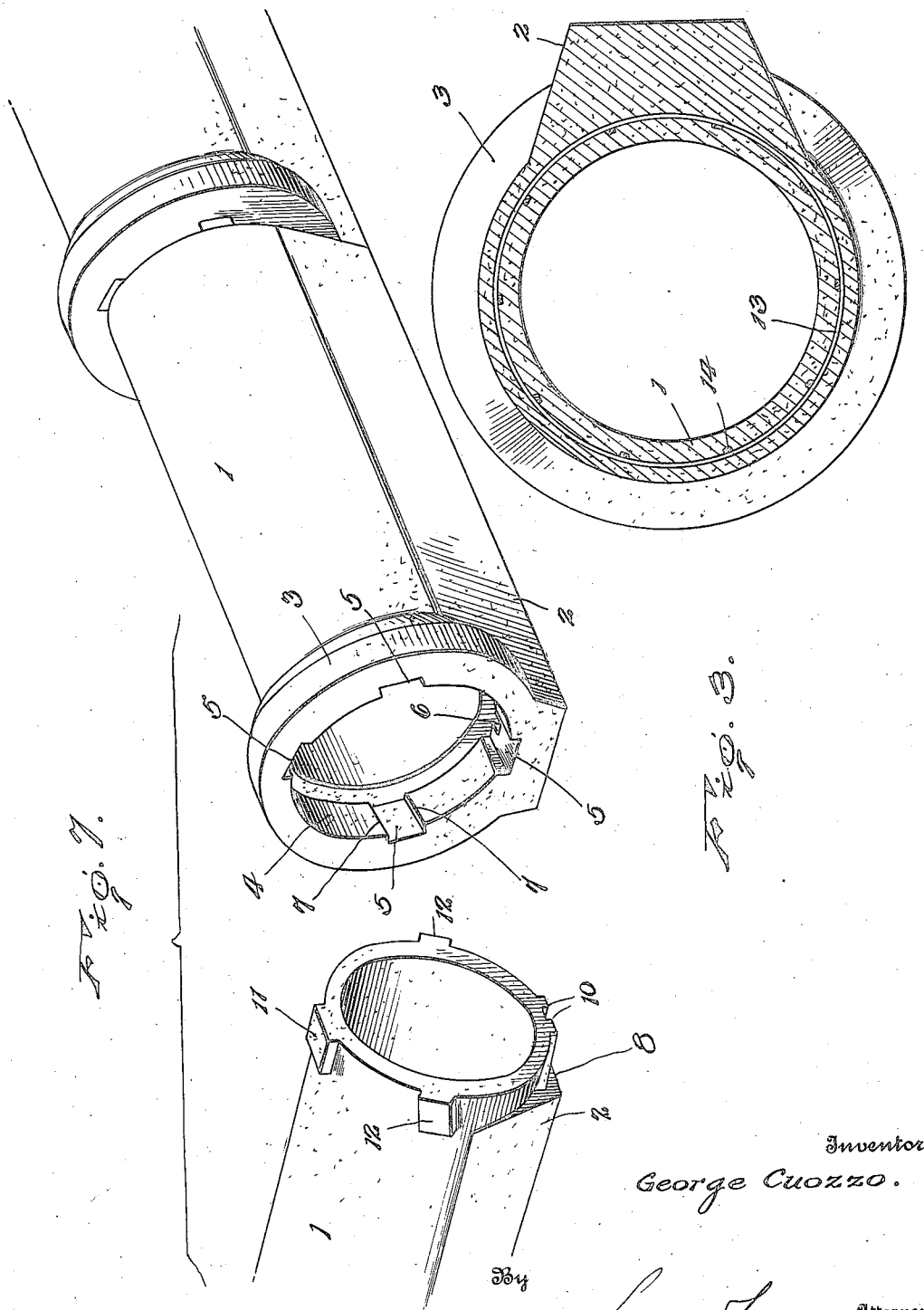

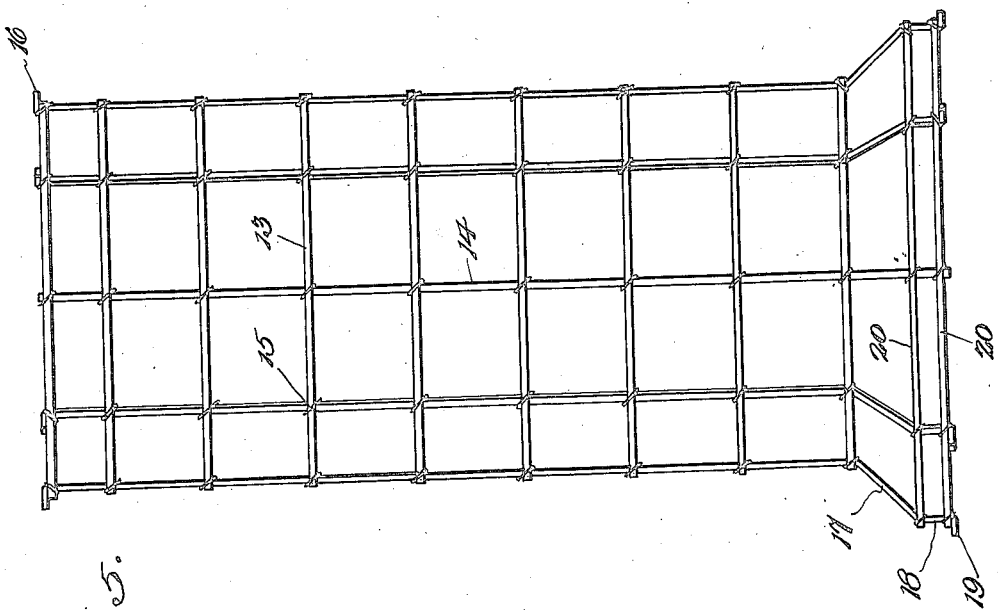
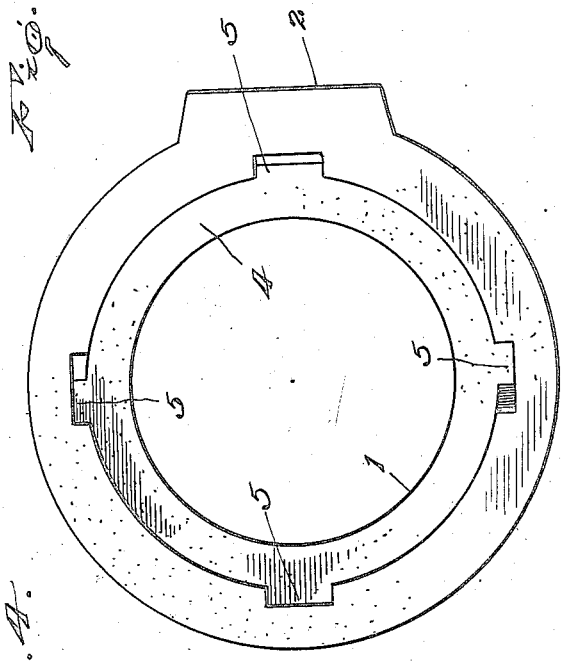
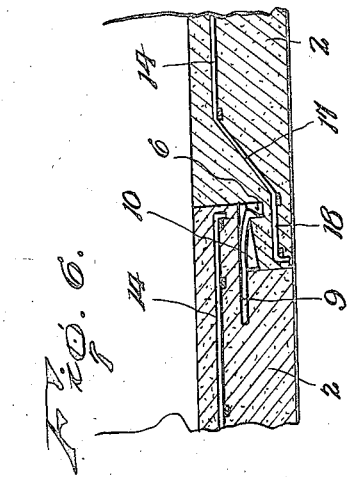

GEORGE CUOZZO, OF BANGOR, MAINE.

CONCRETE PIPE OR CULVERT.

1,413,008.

Specification of Letters Patent. Patented Apr. 18, 1922.

Application filed March 9, 1921. Serial No. 450,876.

*To all whom it may concern:*

Be it known that I, GEORGE CUOZZO, a citizen of the United States, residing at Bangor, in the county of Penobscot and State of Maine, have invented certain new and useful Improvements in Concrete Pipes or Culverts, of which the following is a specification.

This invention relates to concrete pipes or culverts and has for its object the provision of a pipe section which may be easily put in place and expeditiously coupled to an adjoining section. A further object of the invention is to provide a pipe of such construction that when the joint between two meeting sections has been filled by a cementitious material, separation of the pipe sections will be prevented. A further object of the invention is to provide means whereby when the pipe sections are brought together, they will be locked so that accidental endwise separation will be prevented.

The invention is illustrated in the accompanying drawings, in which—

Figure 1 is an elevation of a pipe section embodying my present improvements;

Fig. 2 is a longitudinal section of the same;

Fig. 3 is a transverse section on the line 3—3 of Fig. 1;

Fig. 4 is a plan view of one end;

Fig. 5 is an elevation of the reinforcement employed;

Fig. 6 is an enlarged longitudinal section through a portion of the joint;

Fig. 7 is a perspective view showing the construction of the meeting ends of the pipe sections.

My improved pipe or culvert is to be formed of reinforced concrete within a suitable mold which forms the subject-matter of an application executed simultaneously herewith. In the accompanying drawings, the reference numeral 1 indicates the main body of the pipe which is cylindrical in form and provided with a longitudinal base or supporting rib 2 at one side. The body is also constructed with a flange 3 at one end and within the said flanged end is an annular recess 4 with grooves 5 provided at intervals in the peripheral wall of the said recess. One of the grooves 5 is located midway the sides of the base or supporting rib 2 and this groove has its bottom wall inclined upwardly toward the inner portion of the pipe section and constructed with a notch 6 immediately adjacent the radial wall of the recess 4. The groove diametrically opposite the described groove having the notch 6 is disposed with its opposite longitudinal walls parallel with the axis of the pipe, but the intermediate grooves have their longitudinal walls 7 disposed obliquely with respect to the longitudinal axis of the pipe. The base or supporting rib 2 terminates at one end flush with the outer radial wall of the flange 3 but at its opposite end terminates short of the end of the pipe section, as shown at 8, and embedded in the body of the pipe section and the said rib is a resilient dog or latch 9 which, when the pipe sections are brought together, is adapted to ride up the inclined floor of the bottom groove 5 and engage the notch 6, as shown clearly in Fig. 6, thereby locking the sections together. The said latch or dog is disposed between two longitudinal ribs 10 formed upon the body of the pipe adjacent the end of the base or rib 2 which are so shaped as to fit closely within the groove leading to the notch 6. At a point diametrically opposite the inclined ribs 10, a lug 11 is formed upon the pipe section which has sides parallel with the axis of the pipe, the said rib being adapted to fit closely within the uppermost groove 5 of the meeting section. Between the lug 11 and the ribs 10, the pipe section is provided with diametrically opposite lugs 12, the longitudinal sides of which are disposed obliquely with respect to the axis of the pipe. These relatively obliquely disposed lugs are adapted to enter the obliquely disposed grooves 5 and are somewhat smaller than the grooves so that the oblique arrangement of the grooves and the lugs will not interfere with the assembling of the pipe sections. After the pipe sections are assembled, a cementitious filler is fed into the spaces between the lugs and the walls of the grooves so that, when said filler has set, the pipe sections will be permanently joined.

In making the pipe section, before any of the green cement is poured into the mold and tamped down, a reinforcement is placed within the mold and arranged concentrically between the inner and outer walls of the same. This reinforcement consists of rings 13 provided in a number corresponding to the length of the pipe section to be formed and disposed at such intervals apart as experience may dictate. These rings should be of such diameter as to be disposed midway the inner and outer surfaces of the completed pipe and they are held in fixed spaced relation by longitudinal bars or rods 14 which extend from end to end of the pipe section, as shown. The bars are tied to the rings by wire loops 15 or any other inexpensive means which may be preferred and at one end each bar or rod is bent laterally outward, as shown at 16, so as to be held against longitudinal movement when embedded within the completed pipe. At the opposite end of the reinforcing cage, the longitudinal bars or rods are bent outwardly in an oblique position, as shown at 17, and then extended longitudinally, as shown at 18, terminating in outturned lugs 19, as shown. The portions 17 and 18 of the reinforcement conform to the flange 3 of the pipe, as will be readily understood on reference to Fig. 2, and immediately adjacent the lugs 19 and the bend connecting the portions 17 and 18, rings 20 are tied or otherwise connected to the several bars or rods.

Obviously, the mold is so shaped that plastic material deposited therein and subjected to sufficient pressure to form a homogeneous mass will assume the form shown in the drawings and above described. In forming the pipe, the mold is set on end while resting upon a pallet or other firm support and the cage is brought into proper position within the mold, after which the concrete or other plastic material is fed into the mold so as to fill the same and embed the reinforcement.

The base 2 has flat surfaces upon all its outer sides so that when it is placed in the bottom of a trench or upon the surface of the ground, if it is to be so employed, it will be supported against turning movement and the pipe sections may be readily alined so as to form the completed culvert or other conduit. The engaging lugs and grooves will aid in guiding the adjacent pipe sections into alinement and when the joint has been sealed in the manner described, a watertight or leak-proof union will be effected. The reinforcing cage embedded in the pipe furnishes a firm support for the plastic material throughout the entire extent of the pipe section and a very strong and durable pipe is produced at a very low cost. The spring dog or latch which serves to initially lock the sections together prevents displacement of the coupled sections while the joint is being sealed and thereby reduces the labor and time necessary to provide a conduit or culvert of any desired length. The pipe sections may, of course, be made in any desired dimensions and inasmuch as the supporting base adds to the strength of the lower portion of the pipe considerable weight may be placed upon the pipe without dislodging it or producing fractures therein.

Having thus described the invention, what is claimed as new is:

1. A pipe section consisting of a reinforced concrete body provided at one end with an annular recess receiving the meeting end of an adjacent alined pipe section, there being a longitudinally extending groove in the annular wall of said recess and a radial notch in the base of said groove at the inner end of the same, and a resilient latch at the opposite end of the body, said opposite end of the body being adapted to enter an annular recess in the meeting end of an adjacent alined pipe section and said latch being adapted to ride over the base of the groove in the annular wall of said recess and engage the notch therein.

2. A pipe section consisting of a reinforced concrete body provided at one end with an annular recess and provided in the annular wall of said recess with a longitudinal groove and a radial notch at the inner end of said groove in the base of the same, a pair of longitudinally extending lugs at the opposite end of the body, and a resilient latch disposed between said lugs.

3. A reinforced concrete pipe provided at one end with an annular recess and grooves in the peripheral wall of said recess, some of said grooves having their opposite parallel walls disposed obliquely, and external lugs at the opposite end of the pipe section to engage the corresponding grooves in a meeting pipe section, some of said lugs being obliquely disposed to engage the obliquely disposed grooves and smaller than said grooves to permit the insertion of a plastic filler.

In testimony whereof I affix my signature.

GEORGE CUOZZO. [L. S.]